(12) United States Patent
Young et al.

(10) Patent No.: US 7,739,718 B1
(45) Date of Patent: Jun. 15, 2010

(54) SYSTEM AND METHOD FOR AUTOMATICALLY SENSING THE STATE OF A VIDEO DISPLAY DEVICE

(75) Inventors: Steven Jay Young, Los Gatos, CA (US); Bich Quy Tran, San Jose, CA (US)

(73) Assignee: ARRIS Group, Inc., Suwanee, GA (US)

( * ) Notice: Subject to any disclaimer, the term of this patent is extended or adjusted under 35 U.S.C. 154(b) by 1599 days.

(21) Appl. No.: 10/261,548

(22) Filed: Sep. 30, 2002

Related U.S. Application Data

(63) Continuation-in-part of application No. 10/227,045, filed on Aug. 23, 2002, now Pat. No. 7,533,403, and a continuation-in-part of application No. 10/226,576, filed on Aug. 23, 2002, now abandoned, and a continuation-in-part of application No. 10/227,120, filed on Aug. 23, 2002, now Pat. No. 7,310,355, and a continuation-in-part of application No. 10/226,611, filed on Aug. 23, 2002, now abandoned.

(51) Int. Cl.
*H04N 7/173* (2006.01)
(52) U.S. Cl. ..................... 725/127; 725/130
(58) Field of Classification Search ............... 725/127, 725/130
See application file for complete search history.

(56) References Cited

U.S. PATENT DOCUMENTS

| | | | | |
|---|---|---|---|---|
| 5,953,344 A | * | 9/1999 | Dail et al. | 370/443 |
| 5,961,603 A | * | 10/1999 | Kunkel et al. | 709/229 |
| 5,999,970 A | * | 12/1999 | Krisbergh et al. | 725/109 |
| 6,078,589 A | | 6/2000 | Kuechler | |
| 6,160,990 A | * | 12/2000 | Kobayashi et al. | 725/135 |
| 6,481,013 B1 | * | 11/2002 | Dinwiddie et al. | 725/80 |
| 6,772,437 B1 | * | 8/2004 | Cooper et al. | 725/111 |
| 6,791,995 B1 | * | 9/2004 | Azenkot et al. | 370/436 |
| 6,880,170 B1 | * | 4/2005 | Kauffman et al. | 725/125 |
| 7,032,238 B2 | * | 4/2006 | Parnell et al. | 725/107 |
| 7,099,934 B1 | * | 8/2006 | Ewing et al. | 709/223 |
| 7,162,733 B2 | * | 1/2007 | Kamieniecki | 725/133 |
| 7,246,368 B1 | * | 7/2007 | Millet et al. | 725/111 |
| 2003/0035543 A1 | | 2/2003 | Gillon et al. | |
| 2003/0066082 A1 | * | 4/2003 | Kliger et al. | 725/80 |
| 2004/0251887 A1 | * | 12/2004 | Sparrell et al. | 323/312 |
| 2004/0268407 A1 | * | 12/2004 | Sparrell et al. | 725/116 |

OTHER PUBLICATIONS

Office Action mailed Jun. 12, 2009 in U.S. Appl. No. 11/829,699, filed Jul. 27, 2007.
Notice of Allowance mailed Jun. 7, 2007 in U.S. Appl. No. 10/335,440, filed Dec. 30, 2002.

\* cited by examiner

*Primary Examiner*—Christopher Kelley
*Assistant Examiner*—Franklin S Andramuno
(74) *Attorney, Agent, or Firm*—Troy A. Van Aacken; Robert J. Starr

(57) ABSTRACT

A system is described comprising: a local node to distribute multimedia content to a plurality of remote nodes; a power detection module to detect power usage of a multimedia device coupled to a first one of the remote nodes; a power analysis module to determine, based on the detected power usage, whether the multimedia device is in a first power state or a second power state; and a transmitter to transmit an indication of the detected state to the local node, the indication usable by the node to allocate multimedia processing resources across the plurality of remote nodes.

42 Claims, 10 Drawing Sheets

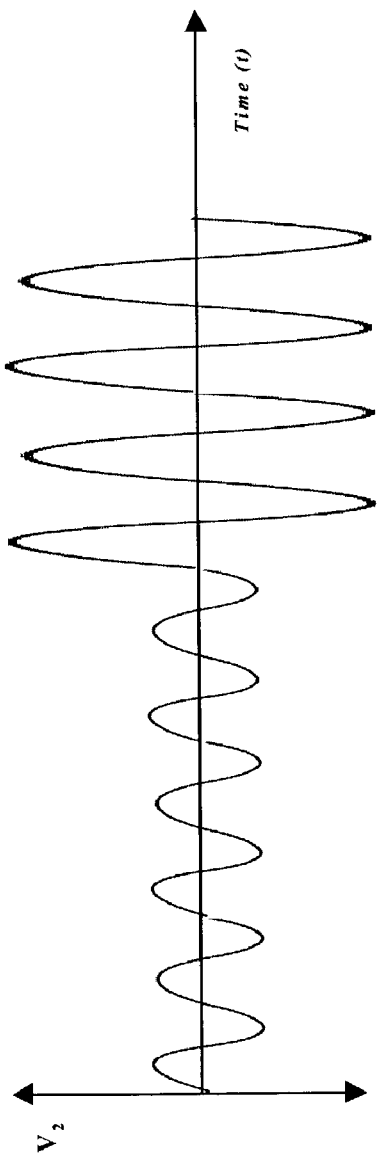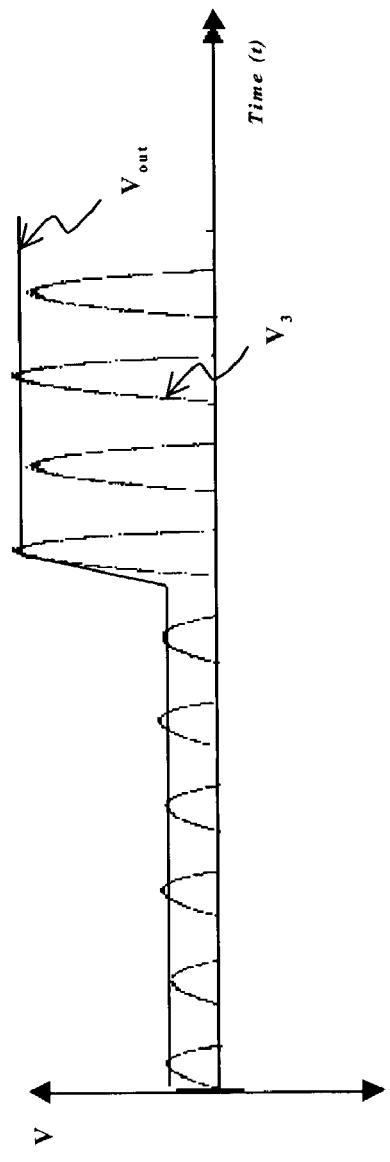
Fig. 10a
Fig. 10b

SYSTEM AND METHOD FOR AUTOMATICALLY SENSING THE STATE OF A VIDEO DISPLAY DEVICE

PRIORITY

This application is a continuation-in-part of the following applications:

An Apparatus and Method for Distributing Video Content Using Existing Network Wiring, Ser. No. 10/227,045, filed Aug. 23, 2002 now U.S. Pat. No. 7,533,403;

A System and Method for Improving Network Utilization by Frequency-Shifting Signals, Ser. No. 10/226,576, filed Aug. 23, 2002 now abandoned;

An Apparatus and Method for Powering a Network Device, Ser. No. 10/227,120, filed Aug. 23, 2002 now U.S. Pat. No. 7,310,355;

A System and Method for Distributing Audio and Video Content to a Plurality of Multimedia Nodes, Ser. No. 10/226,611, filed Aug. 23, 2002 now abandoned.

BACKGROUND

1. Field of the Invention

This invention relates generally to the field of multimedia distribution. More particularly, this invention relates to a system and method for automatically sensing the state of a video display device.

2. Description of the Related Art

When subscribing to a cable or satellite television service, a cable or satellite receiver is typically required for each television set within the user's home. One problem with this scenario is that cable and satellite receivers, or "set-top boxes," are costly to manufacture, particularly those equipped with mass storage devices for storing television programming (commonly known as "Personal Video Recorders" or "PVRs"). As such, requiring an individual set-top box for each television set is an unreasonable solution in many cases (e.g., particularly if the user has numerous television sets).

To solve this and other problems, the assignee of the present application has developed a multimedia system and associated technologies for distributing multimedia content (e.g., cable/satellite television programming) from a primary receiver device to a plurality of secondary devices. The primary receiver device is a relatively high-powered device (i.e., relative to the secondary devices), capable of concurrently processing multiple satellite/cable channels and distributing those channels to the secondary devices. Because most of the signal processing load is handled by the primary receiver device, the secondary devices can be manufactured relatively inexpensively, resulting in a more efficient solution for the end user and the cable/satellite service provider.

Embodiments of one such multimedia system are set forth in the co-pending application entitled MULTIMEDIA AND COMPUTING SYSTEM, filed Sep. 1, 2000 (Ser. No. 09/653,964), which is assigned to the assignee of the present application and which is incorporated herein by reference. As illustrated in FIG. 1, in one embodiment of the exemplary multimedia system, a media server 110 (e.g., a "set-top box" or game console) equipped with a processor and a mass storage device acts as a central repository for decoding and storing multimedia content and distributing the multimedia content to a plurality of nodes. More particularly, the media server 110 processes multimedia content from Internet communication channels 120 (e.g., DSL, cable modem), broadcast communication channels 130 (e.g., digital/analog cable, satellite), and/or Public Switched Telephone Network ("PSTN") communication channels 170 (i.e., standard telephone) to provide a stable, real-time home media network 140 for a plurality of network devices 150-151, 160-166.

When signal processing and storage resources from a primary device are spread across a plurality of secondary devices, as described above, it is important to allocate those resources in an intelligent manner. For example, if a television set coupled to a particular secondary device is off, it would be beneficial to communicate this information back to the primary device so that the primary device can reallocate the multimedia resources consumed by the secondary device (which is not being used) to a different secondary device, and/or to the storage device on the primary node itself.

BRIEF DESCRIPTION OF THE DRAWINGS

A better understanding of the present invention can be obtained from the following detailed description in conjunction with the following drawings, in which:

FIGS. 10a-b illustrate signals generated according to one embodiment of the invention.

DETAILED DESCRIPTION

In the following description, for the purposes of explanation, numerous specific details are set forth in order to provide a thorough understanding of the present invention. It will be apparent, however, to one skilled in the art that the invention may be practiced without some of these specific details. In other instances, well-known structures and devices are shown in block diagram form to avoid obscuring the underlying principles of the invention.

Overview of an Exemplary Multimedia System

Prior to describing embodiments of the system and method for automatically sensing the state of a video display device, an overview of an exemplary multimedia storage and playback system is provided. It should be noted, however, that many of the specific details of the multimedia system set forth below are not necessary for implementing the underlying principles of the invention. Embodiments of the exemplary multimedia system are set forth in the co-pending applications entitled AN APPARATUS AND METHOD FOR DISTRIBUTING VIDEO CONTENT USING EXISTING NETWORK WIRING, Ser. No. 10/227,045, filed Aug. 23, 2002; A SYSTEM AND METHOD FOR IMPROVING NETWORK UTILIZATION BY FREQUENCY-SHIFTING SIG- NALS, Ser. No. 10/226,576, filed Aug. 23, 2002; AN APPARATUS AND METHOD FOR POWERING A NETWORK DEVICE, Ser. No. 10/227,120, filed Aug. 23, 2002; A SYSTEM AND METHOD FOR DISTRIBUTING AUDIO AND VIDEO CONTENT TO A PLURALITY OF MULTIMEDIA NODES, Ser. No. 10/226,611, filed Aug. 23, 2002, which are assigned to the assignee of the present application and which are incorporated herein by reference.

Figure 4:
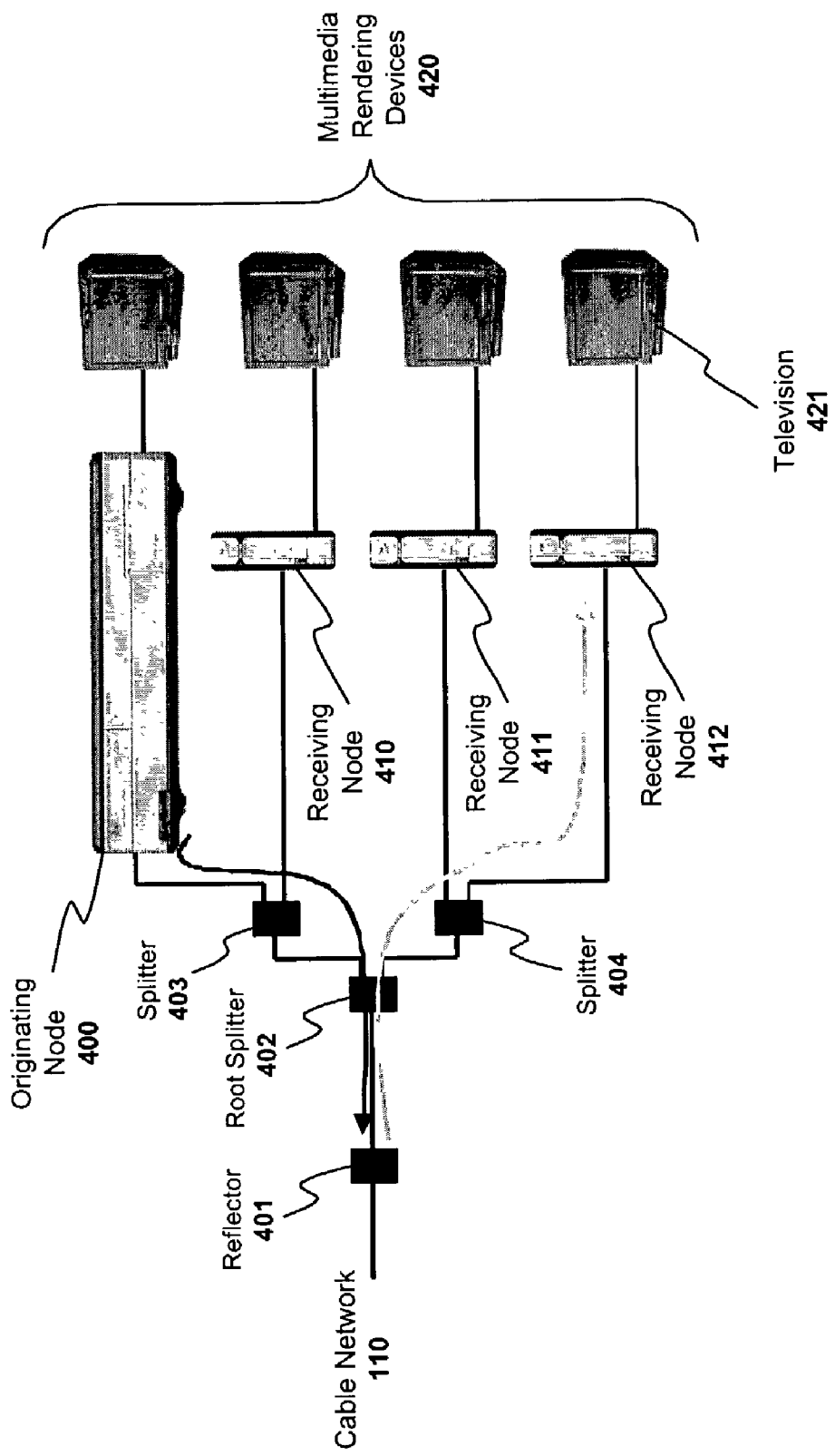
FIG. 4 illustrates an originating node (e.g., a media server) communicating with a plurality of receiving nodes according to one embodiment of the invention.

In one embodiment of the exemplary system, illustrated in FIG. 4, a signal reflector device 401, communicatively coupled between the cable network 110 and a root splitter 402, reflects signals transmitted from the nodes 400, 410-412 of the home network back towards the nodes. For example, a signal transmitted from the originating node 400 illustrated in FIG. 4 will initially pass through splitter 403 followed by the root splitter 402 before reaching the reflector device 401. The reflector device 401 will then reflect the signal back to one of the receiving nodes (e.g., through the root splitter 402 and splitter 404 to reach receiving node 412). As will be described in detail below, the entire reflected signal may propagate along each branch of the splitter tree but only selected portions of the signal may be received and processed by each individual receiving node. For example, each of the receiving nodes 410-412 may be configured to receive signals transmitted from the originating node 400 at a specified carrier frequency. Alternatively, the originating node 400 may transmit data packets containing addresses of specified receiving nodes (e.g., such as TCP/IP packets). The underlying principles of the invention remain the same regardless of how the underlying data is modulated and/or packetized, and regardless of whether the underlying data remains in analog form or is in digital form.

The terms "upstream" and "downstream" as used herein is based on the direction in which cable signals are transmitted from the external cable network 110 (or, rather, the direction in which cable signals would be transmitted if the user were a cable subscriber). Thus, generally speaking, the external cable network 110 is "upstream" relative to the local cable network 110 illustrated in FIG. 4. Similarly, the root splitter 402 is located "upstream" relative to splitters 403 and 404 because a signal transmitted from the external cable network would pass through the root splitter before reaching splitters 402 and 403.

Figure 1:
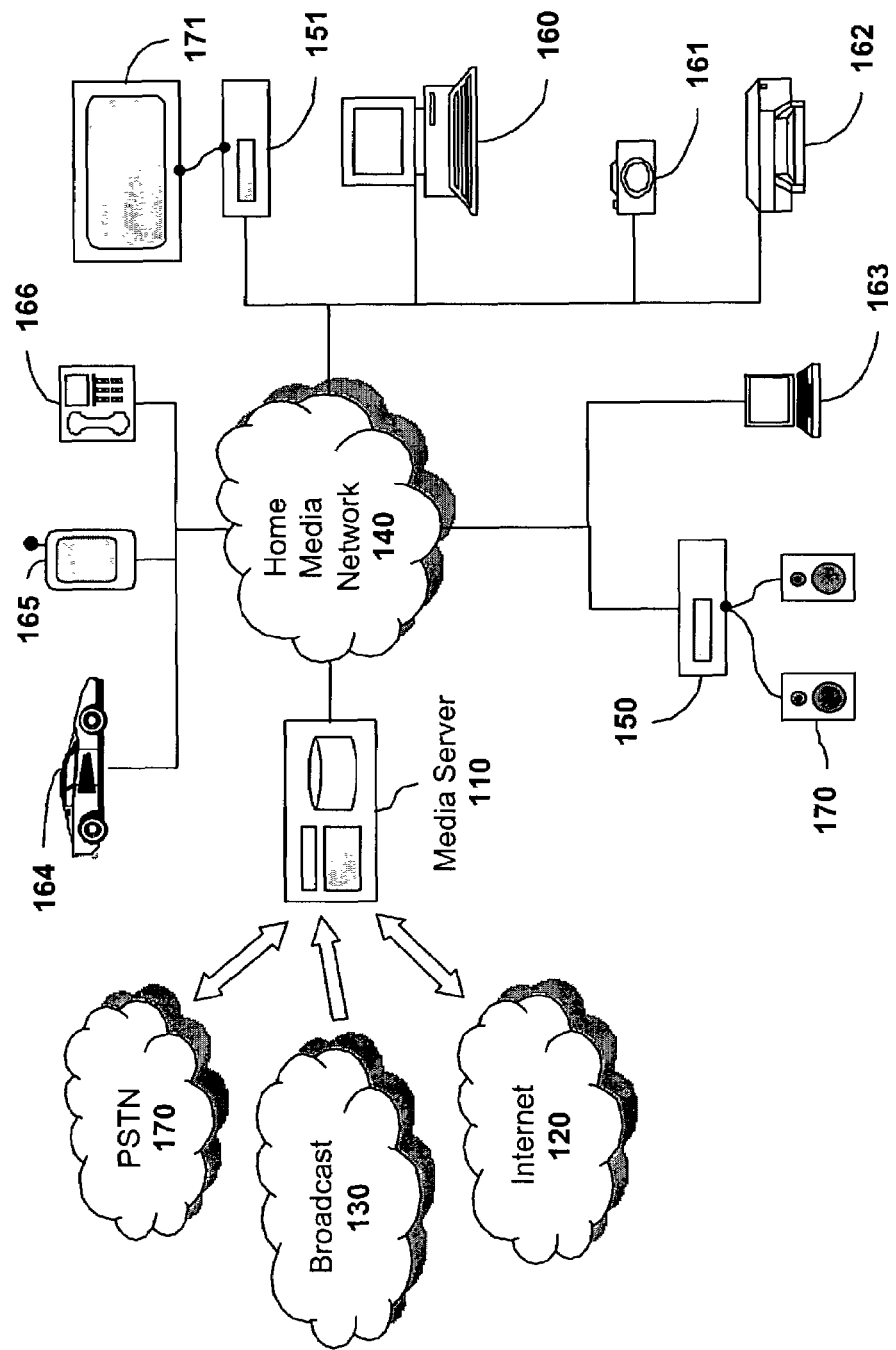
FIG. 1 illustrates one embodiment of a multimedia distribution system including a media server.
Figure 2:
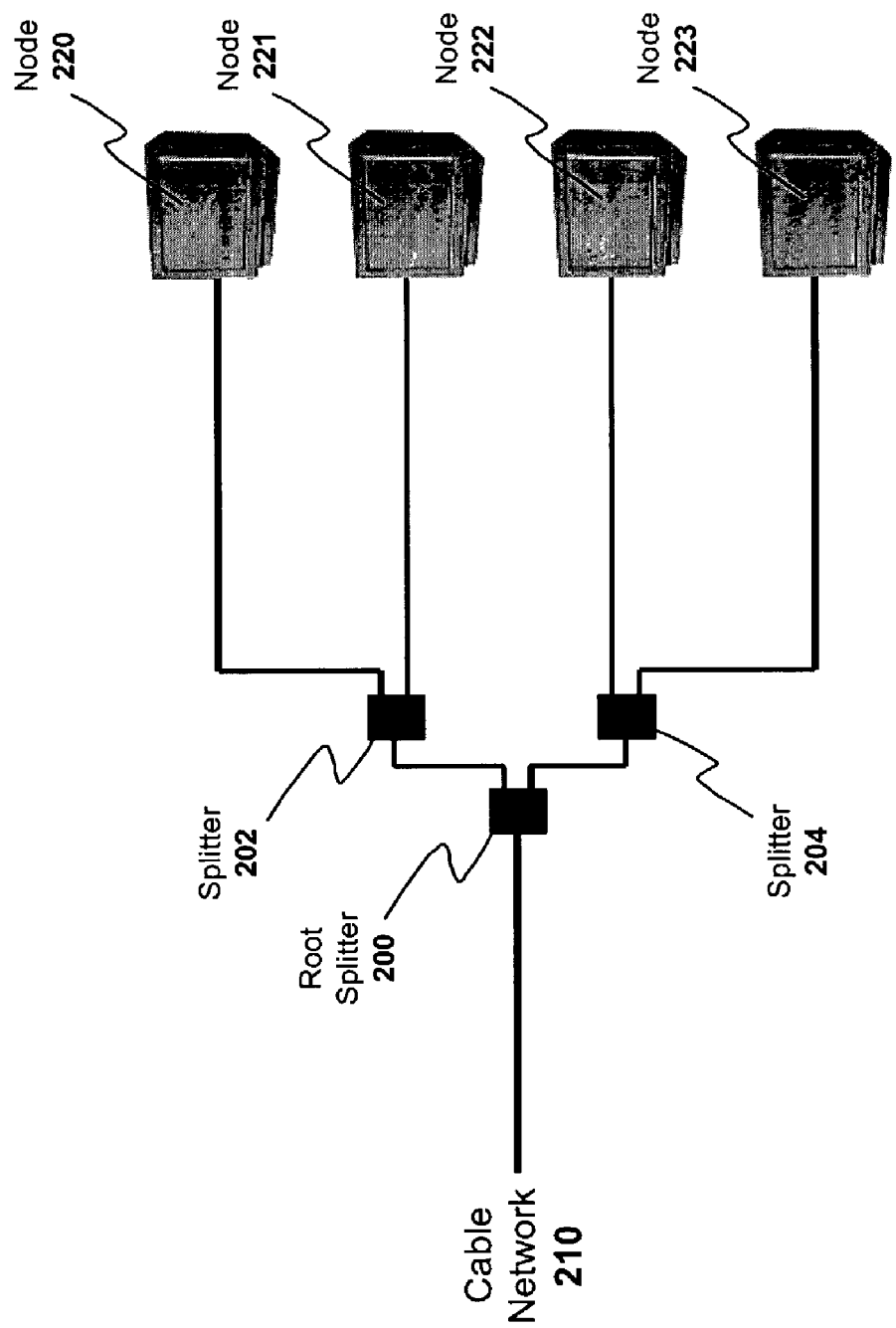
FIG. 2 illustrates the wiring of a typical home coaxial network.

In one embodiment, the originating node 400 is comprised of the hardware/software architecture of the "media server" described in the pending application entitled MULTIMEDIA AND COMPUTING SYSTEM mentioned above. For example, in one embodiment, the originating node 400 concurrently stores and processes content from multiple cable and/or satellite channels as well as other types of multimedia content (e.g., MP-3 audio content ripped from compact disks, Internet content, . . . etc). In addition, as described in the Multiple Stream Application mentioned above, the originating node 400 may concurrently provide live and/or pre-recorded programs to each of the receiving nodes 410-412 (illustrated as distributed multimedia nodes 250-251 in FIG. 2) and may temporarily buffer each of the live programs for "trick mode" functions (e.g., such as pause and rewind of live programs). The buffered and/or pre-recorded program content may be stored on the originating node's 400's mass storage device 330.

The originating node 400 may also be comprised of a completely different architecture than that described in the MULTIMEDIA AND COMPUTING SYSTEM application. For example, the originating node 400 may simply be a DVD player, an MP3 player, a cable/satellite receiver, or an off-air antenna (i.e., equipped with a transmitter for transmitting to the receiving nodes 410-412). In addition, the originating node 400 does not necessarily need a hard drive to comply with the underlying principles of the invention.

In one embodiment, each of the receiving nodes 410-412 is configured to transmit certain types of data back to the originating node 400 via the reflector device 401. For example, control data may be transmitted to identify to the originating node 400 which channels, recorded program content and/or other data the originating node 400 should transmit to each of the receiving nodes 410-412. Examples of these control functions and other information transmitted from the receiving nodes 410-412 are described in greater detail below. As will be described in greater detail below, state information of each video display device coupled to each receiving node 410-412 may also be transmitted through the control channels to the originating node 400.

Figure 3:
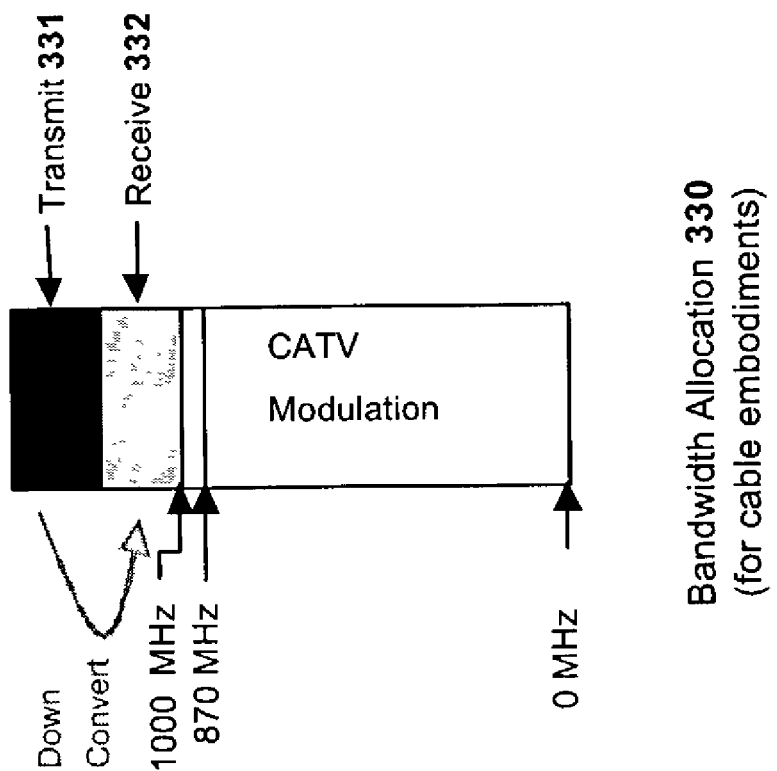
FIG. 3 illustrates an exemplary bandwidth allocation employed over a local network according to one embodiment.

In one embodiment, the signal reflector device 401 down-converts the frequencies at which signals are reflected so as to circumvent any canceling action of the various splitters 402-404. For example, as indicated by the bandwidth allocation 430 shown in FIG. 3, the first 0-1000 MHz of spectrum may be reserved for incoming cable channels. This 1000 MHz limit may vary from operator to operator depending on the frequency plan for the particular operator in question. The attenuation characteristics of most community cable plants are such that most operators typically leave unutilized spectrum above 750 MHz, 860 MHz or 1000 MHz depending on their particular plant configuration. Above this cable operator cutoff frequency, a "transmit" block of spectrum 431 and a "receive" block of spectrum 432 may be defined for signals transmitted towards and reflected away from the reflector device 401, respectively, which do not interfere with the cable services being provided below the cable operator cutoff frequency. In one specific embodiment, the transmit block 431 is defined to be between 1200 MHz and 1400 MHz and the receive block is defined to be between 1000 MHz and 1200 MHz. However, the particular manner in which bandwidth is allocated is not pertinent to the underlying principles of the invention. For example, the transmit block 431 and receive block 432 illustrated in FIG. 4 may be reversed (i.e., signals may be transmitted at a relatively lower frequency than at which they are received). The blocks may also be widened or narrowed, depending on the particular bandwidth requirements of the system.

In one embodiment, if the signal transmitted from the originating node 400 is too weak when it arrives at the reflector device 401 (i.e., if it is below some predefined minimum signal strength value), then various additional steps may be taken to provide a stronger signal. For example, in one embodiment, the splitters 402 and 403 leading to the reflector device 401 may be replaced with devices that attenuate the signal less along the reverse path (e.g., directional couplers). A separate cable may also be run directly from the originating node 400 back to either the reflector device 401 and/or to the root splitter 402. Alternatively, or in addition, the signal transmission power may be increased at the originating node 400 as required to provide an adequate signal at the reflector device 401.

While the reflector device 401 shown in FIG. 4 is positioned upstream relative to the root splitter 402 (i.e., between the root splitter 402 and the external cable network 110), the reflector device 401 may also be positioned downstream of the root splitter 402 while still complying with the principles of the invention (i.e., between the root splitter 402 and splitters 403 and 404).

Figure 5:
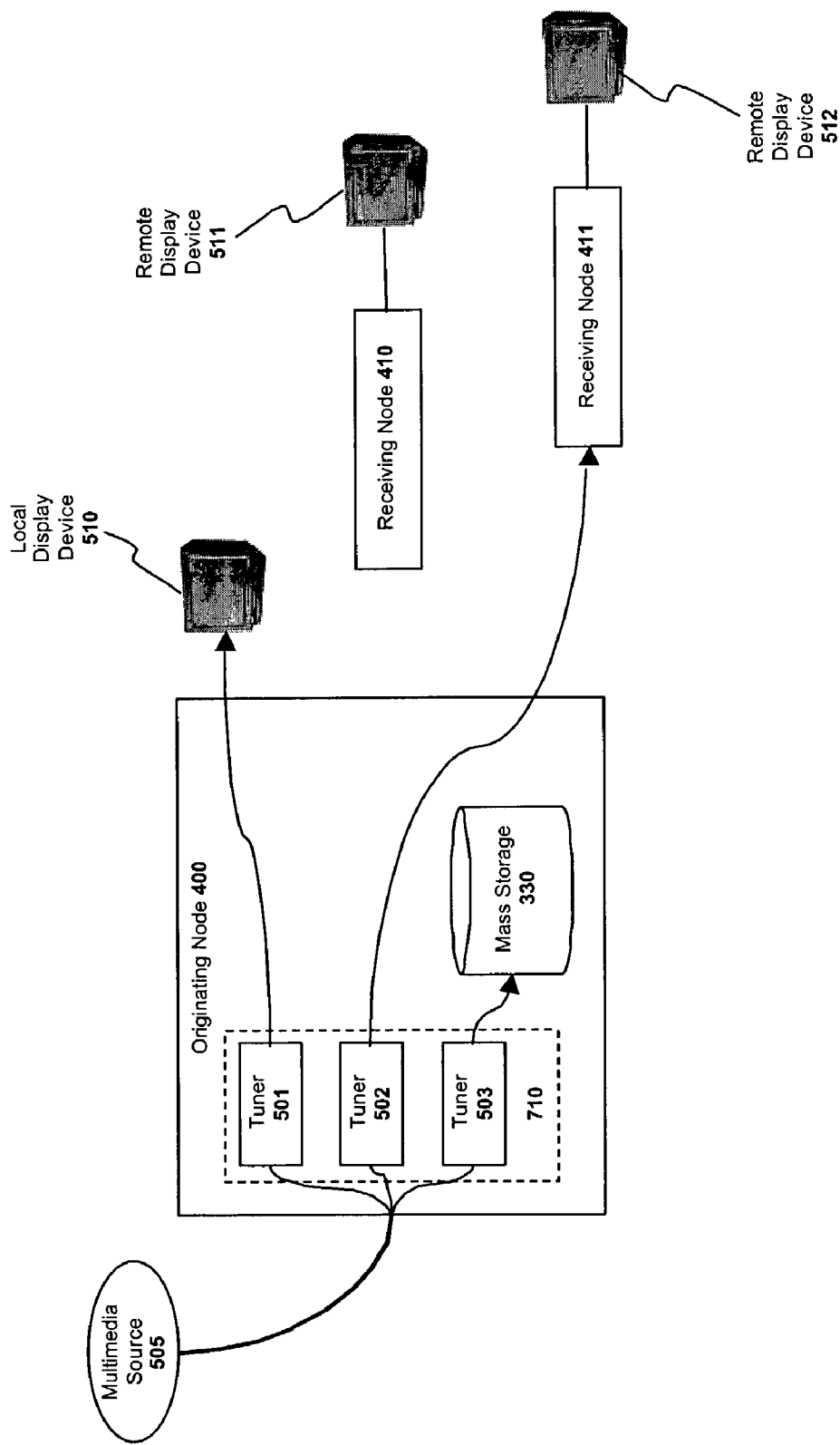
FIG. 5 illustrates one embodiment of a multimedia distribution system having a limited number of tuners.

Embodiments of a System and Method for Automatically Sensing the State of a Video Display Device As mentioned above, the originating node 400 may concurrently supply multimedia content to a plurality of different receiving nodes 410-412 and a mass storage device 330. In some circumstances, however, the originating node 400 may only be capable of processing a limited number of multimedia streams at a time. For example, as illustrated in FIG. 5, if the originating node 400 is only equipped with three standard cable/satellite tuners 501-503, then it may only be capable of concurrently distributing three cable/satellite channels. Accordingly, if one tuner 501 is allocated to the local display device 510 (i.e., the device coupled directly to the originating node, as in a typical set-top box configuration), one tuner is allocated to one of the remote receiving nodes 411 and one tuner is allocated to the mass storage device 503 (e.g., to record a user-specified program), then the originating node 400 is unable to distribute an additional channel to the remaining receiving nodes 410. Similarly, if the originating node 400 allocates all three tuners 501-503 to the local display device 510 and the two receiving nodes 410 and 411, then it is unable to concurrently record a cable/satellite program to the mass storage device 330. It is also unable to distribute an additional channel to any remaining receiving nodes (not shown).

To solve this problem, one embodiment of the invention intelligently allocates tuners to local and remote display devices and mass storage devices based on whether these devices are being utilized. In one embodiment, if a particular display device 411 is not being utilized (e.g., because a user has turned the device off), then the originating node 400 reallocates the tuner servicing the receiving node 410 of that device 511 to an alternate receiving node (e.g., 410), or to the mass storage device 330.

Figure 6:
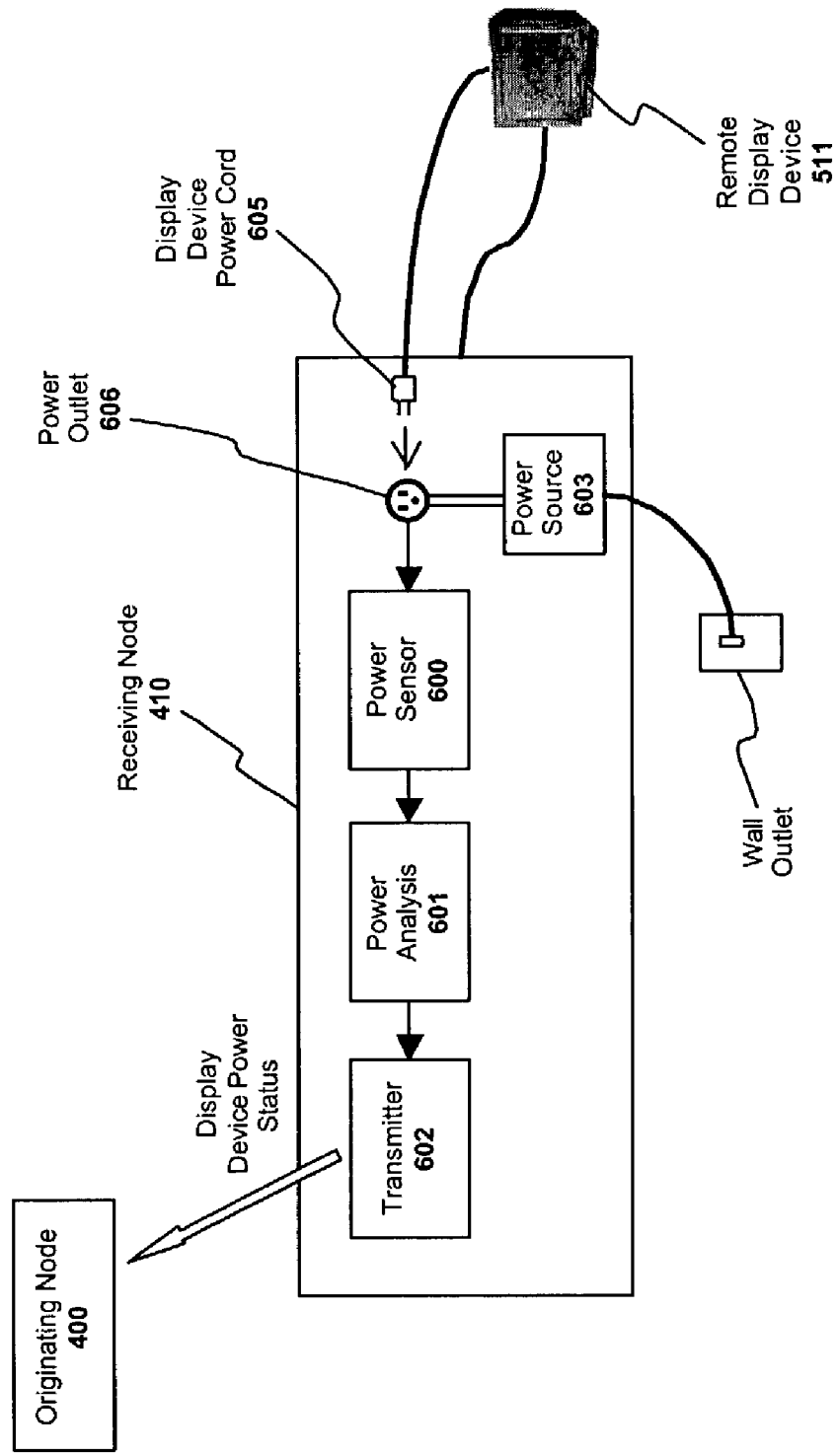
FIG. 6 illustrates one embodiment of a receiving node which includes power detection circuitry and logic.

In one embodiment, power detection circuitry is provided at each display device in order to determine whether the display device is in an on or off state (or in some intermediate "sleep" state). As illustrated in FIG. 6, in one embodiment, power detection circuitry is configured within the receiving node 410 itself. Specifically, a power outlet 606 is provided on the receiving node 410 into which the power cord 605 of the display device 511 is plugged. The power source 603 for the power outlet 600 is provided via the receiving node's 410's connection into a standard power outlet (e.g., a 120 V outlet in the United States).

Figure 8:
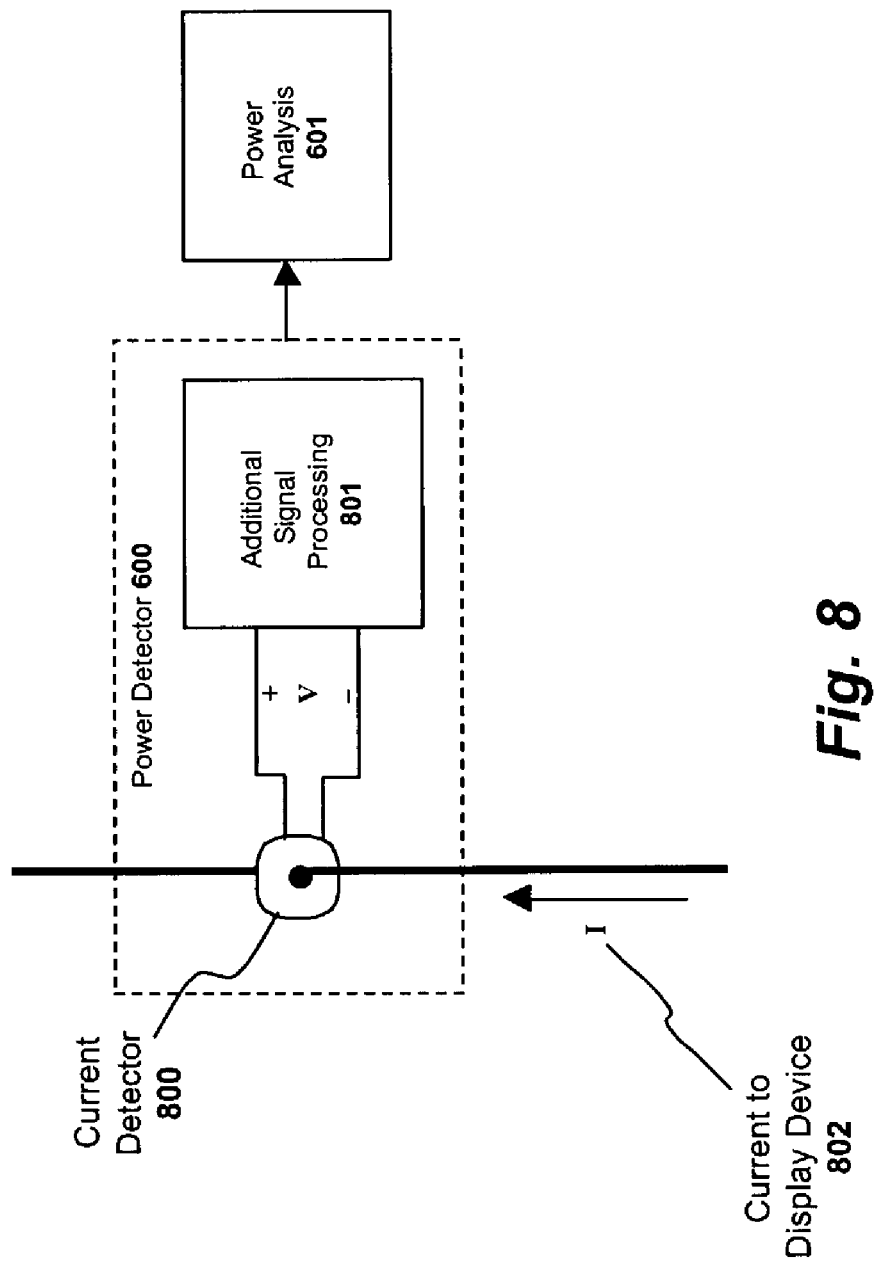
FIG. 8 illustrates a current sensor employed in one embodiment of the invention.

A power detector 600 measures the power being consumed by the display device 511 in both the "on" and "off" states and, potentially, one or more "intermediate" or "sleep" states, and responsively transmits values representing the power consumption to a power analysis module 601. The power detector 600 may not actually calculate the power being consumed by the display device 511 but, rather, may measure some other electrical parameter which indicates the power being consumed. For example, as illustrated in FIG. 8, in one embodiment, the power detector 1100 comprises a current detector 800 which measures the current 802 being drained by the display device 511. Given the well known relationship between current and power (i.e., P=IV), any increase in current drain represents a proportional increase in power consumption. In the illustrated embodiment, the voltage output by the current detector 800 is proportional to the measured current. The voltage may be analyzed/processed directly by a power analysis module 601 (described in greater detail below) or, may be processed by additional signal processing circuitry 801 (certain embodiments of which are described below with respect to FIG. 9) before being provided to the power analysis module 601. It should be noted, however, that the underlying principles of the invention are not limited to any particular mechanism for detecting power consumption in the display device 511.

As mentioned above, the power detector 600 provides the power level indication to a power analysis module 601. In one embodiment, the power level indication is in the form of an analog signal such as a voltage level (e.g., 0.5V=low power level, 0.8 volts=intermediate power level, 2V=high power level). Alternatively, in one embodiment, the power detector 600 converts the analog power level indication into a digital signal before providing the signal to the power analysis module 601. It should be noted, however, that the particular functional unit in which the analog-to-digital conversion occurs is not pertinent to the underlying principles of the invention.

Based on the power indication, the power analysis module 601 makes a determination as to whether the display device 511 is "on," "off," or in some intermediate state. In one embodiment, the power analysis module 601 is a microcontroller programmed to analyze the different values provided to it and responsively identify two or more distinct power states. Alternatively, the power analysis module 601 may be implemented as software executed by a general purpose processor which identifies the different power states.

Different display devices may have significantly different power usage characteristics. For example, different television sets may use significantly different amounts of power in both the "on" and "off" states (even in the "off" state, television sets use a measurable amount of power). Moreover, computer systems typically have numerous power states, the most common of which are "on," "off" and "sleep." The power usage of a computer may also change as the result of the display or hard drive automatically turning off after some specified period of time.

In order to deal with these different power usage characteristics, in one embodiment, when a new display device (e.g., a TV or computer) is initially coupled to the receiving node 410, the power analysis module 601 is reset, and reprogrammed to identify the new power levels used by the new display device. The reprogramming may occur automatically or manually. For example, in one embodiment, after being reset, the power analysis 601 will automatically store different power levels measured over some period of time (e.g., 48 hours) and will identify the "on" state of the display device as the highest observed power level and the "off" state as the lowest observed power level. Alternatively, or in addition, when a user sets up a new receiving node 410, he/she may be directed through a menu-driven set-up process in which he/she will be prompted to cause the display device to enter its various power consumption states. The power analysis module 601 will then store the different power consumption values in memory (e.g., SDRAM, Flash memory, . . . etc).

In one embodiment, the power analysis module 601 measures and evaluates the power consumption of other consumer electronic devices coupled to the display device 511. The power consumed by these additional devices may be measured by a second power outlet (not shown) configured on the receiving node 410. For example, most users currently have a video cassette recorder (VCR), digital video disk (DVD) recorder or other recording apparatus coupled to their television sets. The power analysis module 601 may be programmed to recognize a power state in which the VCR or DVD recorder is recording so that even through the television is "off," the tuner allocated to the receiving node 410 will not be reallocated (as described in greater detail below).

In one embodiment, once the power analysis module has "learned" the various different power states, it continually transmits the current state of the display device 511 and/or any associated electronic devices (not shown) to the originating node 400 via transmitter 602. In one embodiment, the transmitter 602 transmits the state over one of the return control channels mentioned above. However, various alternate transmission mechanisms may be employed while still complying with the underlying principles of the invention. For example, a wireless channel such as an 802.11a, 802.11b, or 802.11g channel may be used to transmit the power state from the receiving node 410 to the originating node 400.

Although the power analysis module 601 is configured within the receiving node 410 in the embodiments described herein, it should be noted that the power analysis module may also be configured within the originating node 400, or any other node in the system, while still complying with the underlying principles of the invention. For example, in one embodiment, the power level detector 600 illustrated in FIG. 6 is directly coupled to the transmitter 602 which transmits the raw power level indication to the originating node 400. The power analysis module at the originating node then identifies the power state indicated by the transmitted power level indication.

Figure 7:
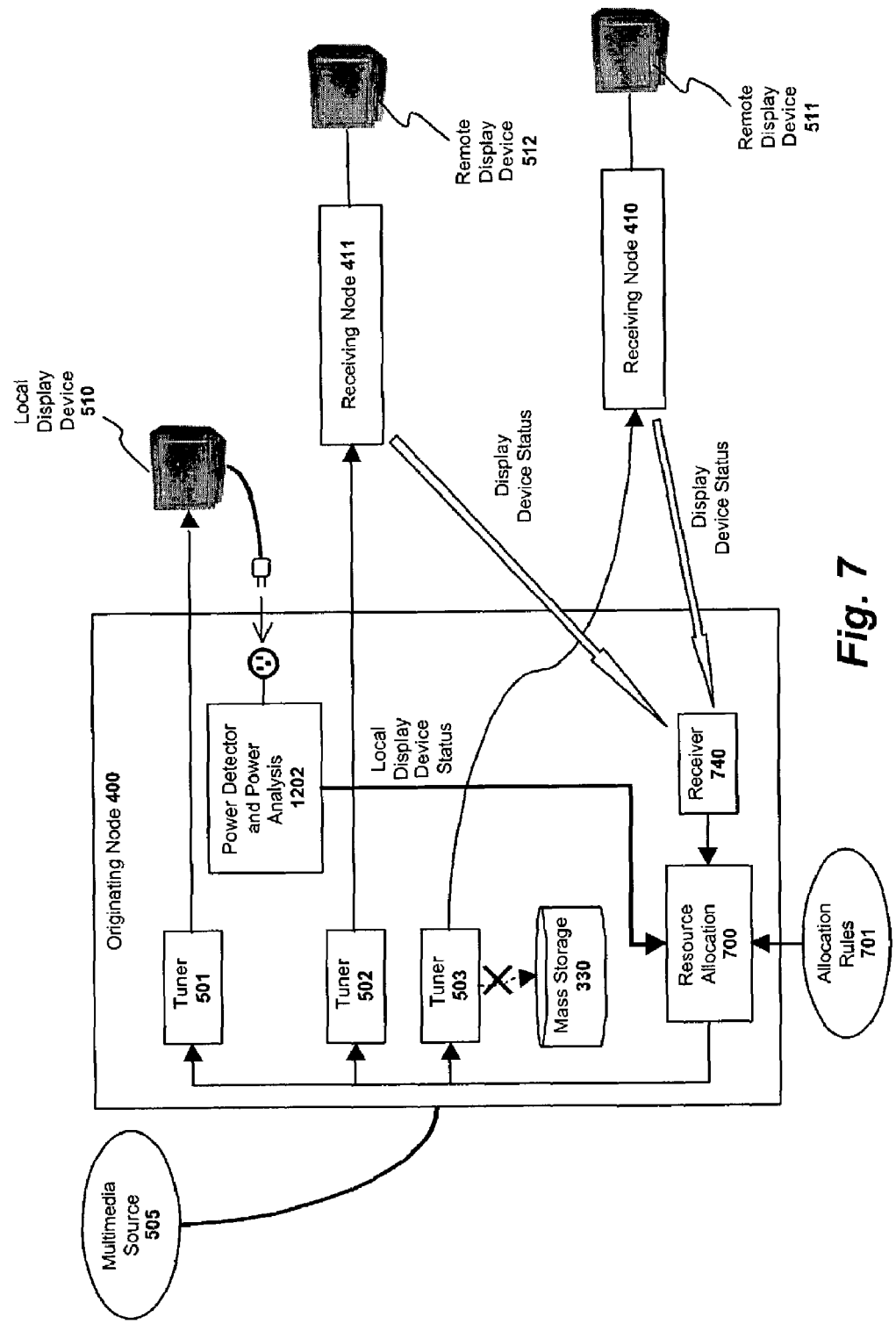
FIG. 7 illustrates an originating node which includes resource allocation logic according to one embodiment of the invention.

As illustrated in FIG. 7, one embodiment of the originating node 400 is comprised of a resource allocation module 700 for allocating each of the tuners 501-503 to the various display devices 510-512 and the mass storage device 330. In one embodiment, the resource allocation module 500 is embodied in software executed by the originating node's general purpose CPU. However, the resource allocation module 700 may be implemented using virtually any type of logic including hardware, software, or firmware, or any combination thereof, while still complying with the underlying principles of the invention.

As described above, the power state of each of the display devices 512, 511 (and/or associated electronic devices) is demodulated by a receiver 740 and provided to the resource allocation module 700. In addition, in one embodiment, a local power detector and a local power analysis module (illustrated as a single module 702 in FIG. 7, for simplicity) are configured on the originating node 400 to provide the power state of the local display device 510 to the resource allocation module 700.

The resource allocation module 700 renders resource allocation decisions based (at least in part) on the power states of the various display devices 510-512 and/or associated electronic devices. For example, as shown in the transition between FIG. 5 and FIG. 7, when the resource allocation module detects that the state of a particular display device 511 has changed from "off" to "on," the resource allocation module 700 attempts to allocate a tuner to the receiving node 410 for that device 511. In the particular example shown in FIG. 7, the resource allocation module 700 reallocates tuner 503 from the mass storage device 330 to the receiving node 410 which supplies the display device 511.

As indicated in FIG. 7, the resource allocation module 700 may be programmed with a set of allocation rules 701 defining the circumstances under which resource reallocation may occur. In one embodiment, the user may define a prioritization scheme in which certain devices take priority over other devices. For example, the user may decide that the display device located in the user's family room should always be capable of receiving a television channel, regardless of what else is happening on the system. As such, when the user turns on the family room television, the resource allocation module 700 reallocates one of the tuners 501-503 from the lowest-priority display device to the family room television.

In addition to prioritizing devices, allocation rules 701 may be developed which prioritize specific processing actions taken by each of the devices. For example, as described above, the power analysis module 601 may be programmed to identify a power state in which a VCR, DVD recorder or other recording device is actively recording a program. If so, the resource allocation module 700 may be programmed so that it never reallocates a tuner when the program provided by the tuner is being recorded on the VCR, DVD recorder or other device. Similarly, as described in detail above, certain user-specified programs may be recorded for later viewing on the mass storage device 330. The resource allocation module 700 may be programmed (via an allocation rule 701) so that it never reallocates a tuner dedicated to a user-specified recording on the mass storage device 701. By contrast, the allocation rules 701 may specify that, when a tuner is recording content to the mass storage device 330 for short-term "trick modes" (e.g., pause and rewind of live television), the tuner may be reallocated to a higher priority device as required.

It should be noted that the specific examples set forth above describing the circumstances under which the resource allocation module reallocates tuners are for the purpose of illustration only. A virtually unlimited number of resource allocation rules 1201 may be applied to the resource allocation module 700 while still complying with the underlying principles of the invention.

Figure 9:
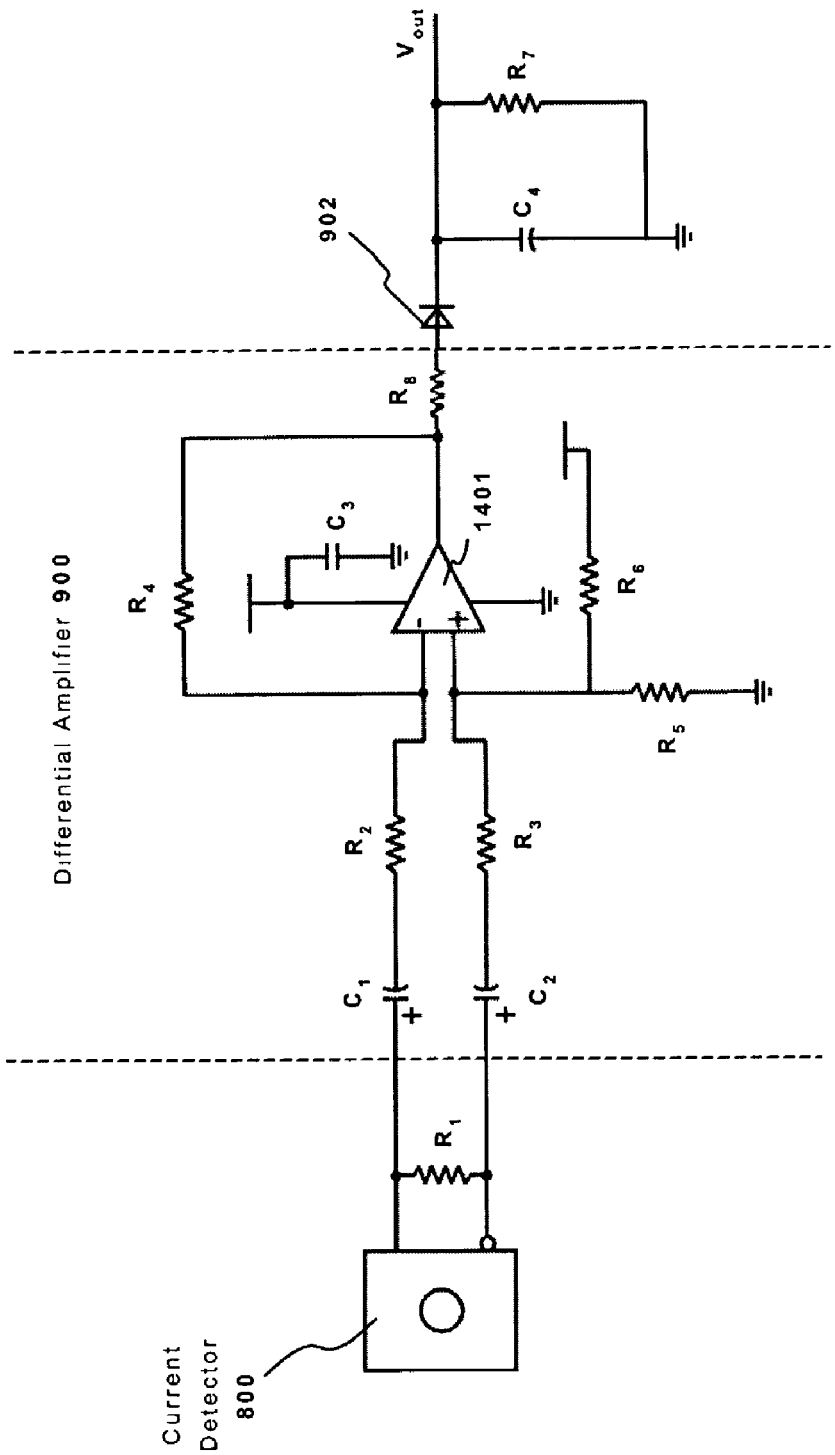
FIG. 9 illustrates power detection circuitry employed in one embodiment of the invention.

One embodiment of the additional signal processing 801 employed within the power detector 600 is illustrated in FIG. 9. The voltage $V_1$ generated by the current sensor 800 is applied across a resistor $R_1$. A differential amplifier 900 amplifies the voltage difference between the legs of the resistor by a specified amount (e.g., ×200, ×500, . . . etc). In the process of amplifying the signal the differential amplifier also removes noise common to both resistor legs (i.e., because the noise in the first leg is subtracted from the noise in the second leg). An exemplary voltage output $V_2$ output from the differential amplifier is illustrated in FIG. 10a. The exemplary voltage shows a transition from a low power state (i.e., the low AC voltage level) to a high power state (i.e., the high AC voltage level).

The amplified signal is then passed through a diode 902 which permits current to flow towards the capacitor $C_4$ but prevents current from flow towards the differential amplifier 900. The voltage output of the diode 902 is the clipped AC voltage, $V_3$, illustrated in FIG. 10b. An RC circuit 901 then detects and smoothes out the peak amplitude of the AC voltage to produce a substantially flat DC voltage, $V_{out}$, illustrated in FIG. 10b. The resistor $R_7$ allows the charge on the capacitor $C_4$ to slowly bleed so a lower peak (from a lower AC voltage) can be tracked. As described above, the high voltage level and the low voltage level of in $V_{out}$ represent two distinct power states which are then provided to the power analysis module 601. The voltage $V_{out}$ may be converted to a digital format by an analog-to-digital converter (not shown) prior to being provided to the power analysis module. Alternatively, the A/D converter may be embedded within the power analysis module 601.

In one embodiment, the following values are used for the circuit shown in FIG. 9: $R_1$=49.9Ω; $R_2$=2.2 kΩ; $R_3$=2.2 kΩ; $R_4$=1.0 MΩ; $R_5$=1.2 MΩ; $R_6$=5.0 MΩ; $R_7$=100 kΩ; $R_8$=100Ω; $C_1$=10 uF; $C_2$=10 uF; $C_3$=100 nF; $C_4$=47 uF. Of course, the underlying principles of the invention are not limited to any particular set of values. Moreover, various alternative circuit designs may be employed to detect the state of the display device and other electronic devices. For example, in one embodiment, a low pass filter is used in lieu of the differential amplifier 900 to detect the average voltage between the legs of resistor $R_1$.

Embodiments of the present invention include various steps, which have been described above. The steps may be embodied in machine-executable instructions which may be used to cause a general-purpose or special-purpose processor to perform the steps. Alternatively, these steps may be performed by specific hardware components that contain hard-wired logic for performing the steps, or by any combination of programmed computer components and custom hardware components.

Elements of the present invention may also be provided as a computer program product which may include a machine-readable medium having stored thereon instructions which may be used to program a computer (or other electronic device) to perform a process. The machine-readable storage medium may include, but is not limited to, floppy diskettes, optical disks, CD-ROMs, and magneto-optical disks, ROMs, RAMs, EPROMs, EEPROMs, magnet or optical cards, or other type of media/machine-readable medium suitable for storing electronic instructions. The computer program product may be transmitted via a propagation media. For example, the present invention may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of embodiments of the present invention. It will be apparent, however, to one skilled in the art that these embodiments may be practiced without some of the specific details. For example, while the embodiments described above determine the state of a display device based on power consumption, various alternate techniques for determining the state of a display device (or other device) may be employed while still complying with the underlying principles of the invention. If the display device is a computer, for example, the state of the computer may be ascertained by communicating with the computer directly (e.g., to determine whether the computer is in a sleep mode or other low power state), rather than measuring the power consumed by the computer directly.

In addition, while the audio and video information transmitted by the originating node 400 described above is separated into its luminance (Y) chrominance (C) and audio (L, R) components, various alternate audio/video representations may be used (e.g., component video (YCbCr), HPNA-C, MPEG-2 streaming, Dolby® digital or DTS surround sound, . . . etc).

Moreover, while described above in the context of a coaxial cable network, many aspects of the invention may be employed on other physical media types including, but not limited to, standard telephone networks. In one embodiment, the originating node 400 and the receiving nodes 410-412 may be configured to communicate with one another wirelessly (e.g., according to the 802.11a, 802.11b or Bluetooth standards). For example, the originating node may be configured to transmit multimedia content wirelessly to any receiving nodes which are not located near cable outlets. Similarly, the control channels enabling communication from the receiving nodes to the originating node 400 may be provided over any form of wireless or wired communications medium.

Although described above in the context of a cable service provider, many principles set forth above may be implemented with a satellite service provider as well. For example, the originating node 400 may receive, process and retransmit satellite signals to the receiving nodes 410-412 using many of the retransmission techniques described above. Finally, various different audio interfaces may be employed to provide audio within the apparatus and method described above (e.g., the Sony/Philips Digital Interface ("S/P DIF")).

In addition, while described above in the context of a single originating node 400 which provides multimedia content and data to a plurality of receiving nodes, the invention may be implemented with any number of "originating nodes" and "receiving nodes" (e.g., the originating node is not necessarily a set-top box).

Accordingly, the scope and spirit of the invention should be judged in terms of the claims which follow.

What is claimed is:

1. A system comprising:
a local node comprising a plurality of tuners to distribute multimedia content to a plurality of remote nodes, wherein each of the plurality of remote nodes comprises;
configuration data to associate a power usage level of a multimedia device coupled to the remote node with respective operational states of the multimedia device,
a power detection module to detect a power usage level of the multimedia device coupled to the respective remote node,
a power analysis module to determine, based on the configuration data and the detected power usage level of the multimedia device, whether the multimedia device is in a first operational state or a second operational state, and
a transmitter to transmit an indication of the detected operational state of the multimedia device to the local node;
wherein configuration data of a first one of the plurality of remote nodes associates a first operational state with a first power usage level of a first multimedia device, and wherein configuration data of a second one of the plurality of remote nodes associates the first operational state with a second, different power usage level of a second multimedia device, and
wherein the local node allocates multimedia processing resources to the plurality of remote nodes based on the detected operational state of the respective multimedia devices coupled to the plurality of remote nodes.

2. The system as in claim 1, wherein the local node comprises:
a receiver to receive the indication from the plurality of remote nodes of the detected operational state of a respective multimedia device coupled the respective remote nodes; and
a tuner allocation module to allocate the plurality of tuners to specified remote nodes based on the indication of the detected operational state of the multimedia devices coupled to the respective remote nodes.

3. The system as in claim 2 wherein, responsive to detecting that a multimedia device connected to a first remote node is in a first operational state and that a multimedia device connected to a second remote node is in a second operational state, the tuner allocation module allocates a tuner from the first remote node to the second remote node.

4. The system as in claim 2, wherein the local node further comprises:
- local configuration data to associate a power usage level of the local multimedia device with the respective operational states,
- a local power detection module to detect a power usage level of the local multimedia device coupled to the local node, and
- a power analysis module to detect whether the local multimedia device is in a first operational state or a second operational state based on the local configuration data and the detected power usage level of the local multimedia device and to transmit an indication of the detected operational state to the tuner allocation module.

5. The system as in claim 4, wherein the multimedia device coupled to the local node comprises a television.

6. The system as in claim 1, wherein the power analysis module detects whether the multimedia device coupled to the first one of the remote nodes is in a third operational state, the third operational state residing between the first operational state and the second operational state the transmitter transmitting an indication of the third operational state to the local node, the indication usable by the local node to reallocate the multimedia processing resources to the plurality of remote nodes.

7. The system as in claim 1, wherein the power detection module comprises a current detector to detect power usage based on an amount of current consumed by the multimedia device over a period of time.

8. The system as in claim 1, wherein the multimedia device is a television.

9. The system as in claim 1, wherein the multimedia device is a computer system.

10. The system as in claim 2, further comprising a set of tuner allocation rules to program the tuner allocation module, the tuner allocation rules defining circumstances under which the tuner allocation module is to reallocate tuners to each of the remote nodes, at least one of the tuner allocation rules comprising a multimedia device priority.

11. The system as in claim 10, wherein the tuner allocation rules define a first multimedia device with a first priority and a second multimedia device with a second priority, wherein the first priority is higher than the second priority, and wherein the tuner allocation module allocates a tuner to the first multimedia device rather than the multimedia second device.

12. The system as in claim 11, further comprising:
- a mass storage device configured on the local node, wherein the tuner allocation module reallocates a tuner from the mass storage device to a specified one of the remote nodes based on the indication of the detected operational state of the multimedia device coupled to the remote node.

13. The system as in claim 7, wherein the current detector generates an AC voltage related to the current consumed by the multimedia device over time, the power detection module further comprising:
- a differential amplifier to amplify the AC voltage generated by the current detector to produce an amplified AC signal; and
- an RC circuit to generate a DC voltage from the amplified AC signal, the DC voltage representing a peak voltage of the amplified AC signal.

14. An apparatus comprising first and second nodes respectively coupled to different multimedia devices, wherein each node comprises:
- configuration data to associate each of a plurality of power usage levels of a multimedia device with a different respective operational state of the multimedia device, wherein the multimedia device has access to a multimedia processing resource;
- state sensing logic to detect whether the multimedia device having access to the multimedia processing resource is in an active operational state or an inactive operational state based on a detected power usage level of the multimedia device and the configuration data; and
- a transmitter to transmit an indication of the operational state of the multimedia device to a distribution node which supplies the multimedia processing resource to the multimedia device, wherein the distribution node allocates multimedia processing resources to the multimedia device based on the detected operational state of the multimedia device.

15. The apparatus of claim 14, wherein the state sensing logic comprises:
- a power detection module to detect a power usage level of the multimedia device; and
- a power analysis module to determine, based on the detected power usage level and the programming data, whether the multimedia device is in the active operational state or the inactive operational state.

16. The apparatus of claim 14, wherein the multimedia device is a television.

17. The apparatus of claim 14, further comprising:
- a resource allocation module within the distribution node, the resource allocation module making the multimedia processing resource available to other multimedia devices responsive to detecting that the multimedia device is in an inactive operational state.

18. The apparatus of claim 14, wherein the multimedia device is a video recorder.

19. The apparatus of claim 14, wherein the multimedia processing resource is a tuner.

20. The apparatus of claim 17, wherein the resource allocation module comprises prioritization logic to establish priority among the multimedia device and a plurality of additional multimedia devices, wherein if two multimedia devices are in contention for the multimedia processing resource, the distribution node supplies the multimedia processing resource to the multimedia device with the higher priority.

21. A method comprising:
- receiving at a first node, multimedia device configuration data to associate power usage levels of a first multimedia device coupled to the first node with respective operational states of the first multimedia device;
- receiving at a second node, multimedia device configuration data to associate power usage levels of a second multimedia device coupled to the second node with respective operational states of the second multimedia device;
- detecting a power usage level of the first multimedia device coupled to the first node;
- detecting a power usage level of the second multimedia device coupled to the second node;
- determining, based on the multimedia configuration data and the detected power usage level of the first and second multimedia devices, whether each multimedia device is in one of a first operational state or a second operational state;
- transmitting an indication of the detected operational states to a distribution node; and allocating at the distribution node a multimedia processing resource to at least one of the first and second multimedia devices based on the detected operational states.

22. The method as in claim 21, further comprising:
receiving the indication of the detected operational state at the distribution node, wherein the distribution node comprises a set of tuners; and
allocating each tuner in a set of tuners at the distribution node to specified nodes including the first and second nodes based on the indication of the detected operational state of the multimedia devices coupled to the respective specified nodes.

23. The method as in claim 22, wherein, responsive to detecting that a multimedia device connected to the first remote node is in the first operational state and that a multimedia device connected to the second node is in the second operational state, reallocating a tuner allocated to the first node to the second node.

24. The method as in claim 21, further comprising:
detecting whether the multimedia device coupled to the first node is in a third operational state;
transmitting an indication of the third operational state to the distribution node; and
responsive to receiving the indication, the distribution node reallocating a multimedia processing resource allocated to the first node to another node.

25. The method as in claim 21, wherein detecting power usage comprises measuring the amount of current consumed by the multimedia device over a period of time.

26. The method as in claim 21, wherein the multimedia device is a television.

27. The method as in claim 21, wherein the multimedia device is a computer system.

28. The method as in claim 22, further comprising defining relative priorities for each of the multimedia devices, the priorities to be compared when allocating tuners to each of the multimedia devices, wherein multimedia devices with relatively higher priorities will have tuners allocated thereto before devices with relatively lower priorities.

29. The method as in claim 21, wherein the distribution node comprises a mass storage device for storing multimedia content, and wherein the multimedia processing resources are reallocated from the mass storage device to one or more of a plurality of remote nodes, responsive to detected operational state of multimedia devices coupled to each of the respective plurality of remote nodes.

30. A computer-readable storage medium comprising program code which, when executed by a machine, causes the machine to perform the operations of:
detecting a power usage level of a multimedia device coupled to a first node;
accessing at the first node configuration data associating each of a plurality of power usage levels of the multimedia device with a different respective operational state;
determining at the first node, whether the multimedia device is in a first operational state or a second operational state based on the configuration data and the detected power usage level of the multimedia device;
transmitting an indication of the detected operational state to a second node;
accessing at the second node, tuner allocation rules defining how a set of tuners are to be allocated among a set of nodes including the first node, wherein the tuner allocation rules assign a relative priority to multimedia devices coupled to the nodes in the set; and
allocating at the second node a tuner in the set of tuners based on the detected operational state of the first node and the tuner allocation rules.

31. The computer-readable storage medium as in claim 30, comprising additional program code to cause the machine to perform the operations of:
allocating a tuner from the first node to the second node responsive to detecting that a multimedia device connected to the first remote node is in a first operational state and that a multimedia device connected to the second node is in a second operational state.

32. The computer-readable storage medium as in claim 30, wherein detecting power usage comprises measuring the amount of current consumed by the multimedia device over a period of time.

33. The computer-readable storage medium as in claim 30, wherein the multimedia device is a television.

34. The computer-readable storage medium as in claim 30, wherein the multimedia device is a computer system.

35. The computer-readable storage medium as in claim 30, wherein the second node comprises a mass storage device for storing multimedia content, and wherein the multimedia processing resources are reallocated from the mass storage device to one or more of a plurality of remote nodes, responsive to detected operational state.

36. The system of claim 1, wherein the first operational state is a powered off state.

37. The system of claim 1, wherein the second operational state is a powered on state.

38. The system of claim 6, wherein the third operational state is a sleep state.

39. The apparatus of claim 14, further comprising a programming interface to define in the programming data the power usage levels of the multimedia device and to associate the power usage levels with the respective operational states of the multimedia device.

40. The computer-readable storage medium as in claim 30, wherein the multimedia device coupled to the first node is in the second operational state and a multimedia device coupled to a third node in the set of nodes is in the second operational state, the article of manufacture comprising additional program code to cause the machine to perform the operations of:
reallocating at the second node a tuner allocated to the third node to the first node if a priority assigned to the multimedia device coupled to the first node is higher than a priority assigned to the multimedia device coupled to the third node.

41. The computer-readable storage medium as in claim 30, wherein a priority assigned to the multimedia device coupled to the first node is higher than a priority assigned to the multimedia device coupled to the second node, and wherein the multimedia device coupled to the second node is in the second operational state, the article of manufacture comprising additional program code to cause the machine to perform the operations of:
reallocating at the second node a tuner allocated to the first node to the second node responsive to receiving an indication from the first node that the multimedia device coupled to the first node is in a third operational state.

42. A system comprising:
a local node comprising a plurality of tuners to distribute multimedia content to a plurality of remote nodes, wherein each of the plurality of remote nodes comprises;
a power detection module to detect power usage of the multimedia device coupled to the respective remote node, a power analysis module to determine, based on the detected power usage of the multimedia device, whether the multimedia device is in a sleep operational state or a second operational state, and a transmitter to transmit an indication of the detected operational state of the multimedia device to the local node;

wherein the local node allocates multimedia processing resources to the plurality of remote nodes based on the detected operational state of the respective multimedia devices coupled to the plurality of remote nodes.

* * * * *